United States Patent
Dai et al.

(10) Patent No.: US 12,046,009 B2
(45) Date of Patent: Jul. 23, 2024

(54) 3D POINT CLOUD ENCODING AND DECODING METHOD, COMPRESSION METHOD AND DEVICE BASED ON GRAPH DICTIONARY LEARNING

(71) Applicant: SHANGHAI JIAO TONG UNIVERSITY, Shanghai (CN)

(72) Inventors: Wenrui Dai, Shanghai (CN); Xin Li, Shanghai (CN); Shaohui Li, Shanghai (CN); Chenglin Li, Shanghai (CN); Junni Zou, Shanghai (CN); Hongkai Xiong, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/590,993

(22) Filed: Feb. 29, 2024

(65) Prior Publication Data
US 2024/0202982 A1 Jun. 20, 2024

Related U.S. Application Data (63) Continuation of application No. PCT/CN2022/137392, filed on Dec. 8, 2022.

(30) Foreign Application Priority Data

Mar. 22, 2022 (CN) .......................... 202210288552.1

(51) Int. Cl.
*G06T 9/00* (2006.01)
*G06T 9/40* (2006.01)

(52) U.S. Cl.
CPC ................ *G06T 9/001* (2013.01); *G06T 9/40* (2013.01)

(58) Field of Classification Search
CPC .................................. G06T 9/001; G06T 9/40
See application file for complete search history.

(56) References Cited

U.S. PATENT DOCUMENTS 10,652,104 B1 * 5/2020 Munn ...................... G06F 17/16
11,113,845 B2 9/2021 Tourapis et al.
(Continued)

FOREIGN PATENT DOCUMENTS

| CN | 112184840 A | 1/2021 |
| CN | 114708343 A | 7/2022 |

OTHER PUBLICATIONS

X. Li, W. Dai, S. Li, C. Li, J. Zou and H. Xiong, "3-D Point Cloud Attribute Compression With-Laplacian Embedding Graph Dictionary Learning," in IEEE Transactions on Pattern Analysis and Machine Intelligence, vol. 46, No. 2, pp. 975-993, Feb. 2024. (Year: 2024).*

(Continued)

*Primary Examiner* — Charles T Shedrick
(74) *Attorney, Agent, or Firm* — True Shepherd LLC; Andrew C. Cheng (57) ABSTRACT

A graph dictionary learning method for a 3D point cloud comprises: obtaining N point clouds to form training dataset; performing voxelization process on the point cloud data to obtain voxelized point cloud data of the training dataset; performing voxel block division on the point cloud data of the training dataset, selecting a plurality of voxel blocks as the training dataset, and constructing a graph dictionary learning model according to the training dataset; and performing iterative optimization on the graph dictionary learning objective function to obtain a graph dictionary for encoding and decoding a 3D point cloud signal. The present (Continued)

disclosure effectively uses the spatial correlation between point cloud signals to near-optimally remove the redundancy among point cloud signals.

14 Claims, 4 Drawing Sheets

(56) References Cited

U.S. PATENT DOCUMENTS

| | | | |
|---|---|---|---|
| 11,202,098 | B2 | 12/2021 | Mammou et al. |
| 11,836,954 | B2 | 12/2023 | Dai et al. |
| 2018/0373929 | A1* | 12/2018 | Ye .......................... G06V 10/50 |
| 2019/0171905 | A1* | 6/2019 | Ye ........................ G06V 40/161 |
| 2021/0272217 | A1* | 9/2021 | Shu ..................... G06F 18/2136 |
| 2021/0398503 | A1* | 12/2021 | Hori ........................ G09G 5/02 |

OTHER PUBLICATIONS

Y. Shen, W. Dai, C. Li, J. Zou and H. Xiong, "Multi-Scale Structured Dictionary Learning for 3-D Point Cloud Attribute Compression," in IEEE Transactions on Circuits and Systems for Video Technology, vol. 31, No. 7, pp. 2792-2807, Jul. 2021. (Year: 2021).*
W. Hu, X. Gao, G. Cheung and Z. Guo, "Feature Graph Learning for 3D Point Cloud Denoising," in IEEE Transactions on Signal Processing, vol. 68, pp. 2841. (Year: 2019).*
Z. Fu and W. Hu, "Dynamic Point Cloud Inpainting via Spatial-Temporal Graph Learning," in IEEE Transactions on Multimedia, vol. 23, pp. 3022-3034, 2021. (Year: 2021).*
Internation Search Report of PCT/CN2022/137392,Mailed Mar. 1, 2023.
Zeng Jin et al., IEEE Transactions on Image Processing, 3D Point Cloud Denoising Using Graph Laplacian Regularization of a Low Dimensional Manifold Model, 2020, pp. 3474-3489, Issue 29.

\* cited by examiner

3D POINT CLOUD ENCODING AND DECODING METHOD, COMPRESSION METHOD AND DEVICE BASED ON GRAPH DICTIONARY LEARNING

CROSS-REFERENCE TO RELATED APPLICATIONS

This application is a continuation of International Patent Application No. PCT/CN2022/137392 with a filing date of Aug. 8, 2022, designating the United States, now pending, and further claims priority to Chinese Patent Application No. 202210288552.1 with a filing date of Mar. 22, 2022. The content of the aforementioned applications, including any intervening amendments thereto, are incorporated herein by reference.

TECHNICAL FIELD

The present disclosure relates to a solution in the technical field of 3D point cloud data compression, and in particular to a 3D point cloud encoding and decoding method, a compression method and a device based on graph dictionary learning.

BACKGROUND ART

In recent years, with the rapid development of 3D acquisition and sensing equipment, irregular data such as 3D point cloud is widely used in many emerging technical fields, such as automatic driving, virtual reality, augmented reality, telepresence, immersive communication and cultural heritage preservation. A 3D point cloud image usually contains millions of points containing geometry information and attribute information. Thus, its data size is often huge, and it needs a lot of computing resources and storage space. Due to the constraints of actual network bandwidth and limited storage space, the existing storage and transmission requirements in this way have far exceeded the resource constraints of nodes and local computing. Therefore, it becomes an important issue to be solved urgently for exploring an effective 3D point cloud compression method.

After a literature search of the prior art, it is found that early 3D point cloud property compression solutions encoded the representation of point cloud signals by using predefined analytic basis functions. C. Zhang et al. "Point Cloud Attribute Compression with Graph Transform", IEEE International Conference on Image Processing (ICIP 2014), 2014, pioneered the use of graph Fourier transform to decorrelate the point cloud attributes. It used the spatial correlation of the point cloud voxels to construct the nearest neighbor graph, and calculated the Laplacian matrix of the constructed graph as the transformation base matrix to encode the point cloud signals. However, because the calculation of the Laplacian matrix of the graph requires eigenvalue decomposition and the computation complexity is very high, it is not conducive to real-time transmission.

In order to reduce the computational complexity, R. L. de Queiroz et al. proposed the Region-Adaptive Haar Transform (RAHT) in "Compression of 3D Point Clouds Using a Region-Adaptive Hierarchical Transform", IEEE Transactions on Image Processing (TIP 2016), using the geometry information of 3D point cloud to adaptively design a hierarchical basis to transform the point cloud. Subsequently, S. Gu etc. proposed a geometry guided sparse coding method based on to norm constraint in the article "3D point cloud attribute compression using geometry-guided sparse representation" published in the "IEEE Transactions on Image Processing" (TIP 2020) in 2020, using the geometry information of point cloud signals to design a fixed basis and removing the redundancy between point cloud signals based on the sparse coding method for compressive decoding. However, the above-mentioned non-Euclidean space sparse representation method relies heavily on geometry information and ignores the statistical characteristics of the signal. It needs to use the pre-defined transform derived from strict mathematical expressions, and cannot adaptively express complex spatially irregular multidimensional signals.

Y. Shen et al. proposed a structured sparse representation coding solution based on multi-scale dictionary learning in "Multi-scale structured dictionary learning for 3-D point cloud attribute compression" of IEEE Transactions on Circuits and Systems for Video Technology (TCSVT 2020) in 2020, which learned a multi-scale dictionary and obtained a structured sparse representation by using the statistical properties of 3D point cloud so as to improve the performance of compressed representation. However, this method does not take into account the inherent geometry structures of 3D point cloud. Therefore, it cannot effectively represent irregular high-dimensional signals distributed in a complex topological space, so that the compression performance is limited.

In addition, the MPEG 3DG PCC standardization organization has issued a call for proposals on 3D point cloud compression in 2017, and has promoted to the final draft stage. It divides the 3D point cloud into three different categories: static 3D point clouds (Category 1), dynamic and time-varying 3D point clouds (Category 2) and dynamically acquired 3D point clouds (Category 3). For these three different types of 3D point clouds, it publishes three different test models (TMs), including TMC1 for static point clouds using RAHT, TMC2 for dynamic and time-varying point clouds based on existing image and video encoding methods, and TMC3 for dynamically acquired point clouds based on a predictive lifting transform. Since TMC1 and TMC3 are both transform coding solutions based on geometry information, they are finally merged together, which is called Geometry-based Point Cloud Compression (G-PCC). TMC2 is also termed as Video based Point Cloud Compression (V-PCC) that projects the textured point clouds into video frames to be coded by existing video encoder (e.g., HEVC). However, V-PCC may introduce unavoidable distortion in the process of projection. G-PCC only exploits geometric structure information and does not consider the statistical characteristics of the point cloud attribute signals, thus reducing the compression efficiency of 3D point cloud attribute signals.

SUMMARY OF THE INVENTION

In view of the above-mentioned problems, the present disclosure proposes a graph dictionary learning method for a 3D point cloud, and an encoding and decoding method, a compression method and a device based on graph dictionary learning.

According to a first aspect of the present disclosure, a graph dictionary learning method for 3D point cloud is provided, including:
 obtaining a training dataset of N point cloud data;
 performing voxelization process on the N point cloud data of the training dataset to obtain voxelized point cloud data of the training dataset;
 performing voxel block division on the voxelized point cloud data of the training dataset, selecting a plurality of voxel blocks as a training dataset for the graph dictionary learning, constructing a graph dictionary learning model according to the training dataset, and establishing a graph dictionary learning objective function; and performing iterative optimization on the graph dictionary learning objective function to obtain a graph dictionary for encoding and decoding 3D point cloud signals.

Preferably, the performing voxelization processing on the N point cloud data of the training dataset to obtain voxelized point cloud data of the training datasets includes:

dividing the point cloud data into regular and axis aligned voxels; and calculating geometric coordinates and attribute signals of each voxel to obtain the voxelized point cloud data.

Preferably, the performing voxel block division on the voxelized point cloud data of the training dataset and selecting a plurality of voxel blocks as a training dataset for the graph dictionary learning includes:

uniformly dividing a boundary cube where all the voxelized point cloud data of the training dataset is located into m×m×m voxel blocks, m being a pre-set side length;

sorting all the voxel blocks of each point cloud data of the training dataset in descending order according to the number of contained voxels;

selecting top r voxel blocks containing the most number of voxels from each point cloud data of the training dataset, and calculating average values of the attribute signals of the voxels contained in each voxel block in the top r voxel blocks as a direct current attribute signal of the voxel block, r being a pre-set positive integer; and subtracting the direct current attribute signal from each voxel to obtain a residual attribute signal as a training signal, forming a training dataset for graph dictionary learning.

Preferably, the constructing a graph dictionary learning model according to the training dataset, and establishing a graph dictionary learning objective function, including constructing the graph dictionary learning model based on a nonlinear p-Laplacian operator, includes:

constructing a topology-connected graph structure $\mathcal{G} = (V, \varepsilon, W)$ by regarding the signal in the training dataset as a graph signal, wherein V represents a set with $m^3$ nodes; $\varepsilon$ represents a set of edges connecting $m^3$ nodes; $W \in \mathbb{R}^{m^3 \times m^3}$ represents a weight matrix of the edges;

constructing a graph dictionary learning model by using the eigen-basis functions of p-Laplacian operator of the topology-connected graph structure to establish a graph dictionary learning objective function:

$$\min_{D,A} \frac{1}{n}\sum_{i=1}^{n}\frac{1}{2}\|M_i(x_i - Da_i)\|_2^2 + \beta\sum_{s=1}^{S}J(D_s) + \gamma\|D^TD - I\|_F^2 + \frac{\lambda}{n}\sum_{i=1}^{n}\|\alpha_i\|_1$$

where $x_i \in \mathbb{R}^{m^3}$ represents an $i^{th}$ training voxel block; $M_i \in \mathbb{R} R^{m_i \times m^3}$ represents a mask matrix with each element having a value of 0 or 1 used for extracting a corresponding $m_i$ voxels from $x_i$; $D \in \mathbb{R}^{m^3 \times Sm^3}$ represents an overcomplete graph dictionary composed of S complete sub-dictionaries, namely, $D = [D_1, \ldots, D_S]$;

$$J(D_s) = \sum_{k}\frac{\sum_{ij}w_{ij}|d_{ski} - d_{skj}|^{p_s}}{2\|d_{sk}\|_{p_s}^{p_s}}$$

is used for constraining an eigen-basis of the $p_s$-Laplacian operator corresponding to the complete sub-dictionary $D_s$; $w_{ij}$ represents an element in an $i^{th}$ row and a $j^{th}$ column of a weight matrix W; $d_{sk}$ represents a $k^{th}$ atom in an $s^{th}$ sub-dictionary; $d_{ski}$ represents an $i^{th}$ element in $d_{sk}$; $A \in \mathbb{R}^{Sm^3 \times n}$ represents a sparse coefficient matrix; $\alpha_i \in \mathbb{R}^{Sm^3}$ represents a sparse coefficient of a signal $x_i$ using the graph dictionary D, a column vector of the sparse coefficient matrix A; $I \in \mathbb{R}^{Sm^3 \times Sm^3}$ represents an identity matrix; n=Nr is the number of voxel blocks of the training dataset; $p_s$ represents a power index parameter corresponding to the $s^{th}$ sub-dictionary; $\beta$, $\gamma$ and $\lambda$ represent corresponding regularization parameters; $\|\omega\|_p$ represents an $\ell_p$ norm of the vector; and $\|\cdot\|_F$ represents a Frobenius norm of the matrix.

Preferably, the performing iterative optimization on the objective function of the graph dictionary learning model to obtain a graph dictionary for encoding and decoding 3D point cloud signals includes:

performing iterative optimization on the graph dictionary learning objective function to obtain a graph dictionary, wherein in each iteration, alternately solving a geometry adaptive sparse coding sub-problem by fixing the dictionary D and solving a graph dictionary update sub-problem by fixing the sparse coefficient matrix A until reaching a predetermined number of iterations, and obtaining a graph dictionary for encoding and decoding the 3D point cloud signals.

Preferably, the performing iterative optimization on the graph dictionary learning objective function to obtain a graph dictionary includes:

according to the fixed graph dictionary D obtained by solving the graph dictionary update sub-problem, solving geometry adaptive sparse coding sub-problems one by one for the voxel blocks to obtain a sparse coefficient matrix A;

$$\min_{\alpha_i}\frac{1}{2}\|M_i(x_i - Da_i)\|_2^2 + \lambda\|\alpha_i\|_1, \quad i = 1, 2, \ldots, n$$

according to the fixed sparse coefficient matrix A obtained by solving the geometry adaptive sparse coding sub-problem, solving the graph dictionary updating sub-problem by an alternating direction method of multipliers to obtain a graph dictionary D;

$$\min_{D}\frac{1}{n}\sum_{i=1}^{n}\frac{1}{2}\|M\circ(X - DA)\|_F^2 + \beta\sum_{s=1}^{s}J(D_s) + \gamma\|D^TD - I\|_F^2$$

where $\circ$ represents a Hadamard product performing element-by-element multiplication; $X = [x_1, \ldots, x_n] \in \mathbb{R}^{m^3 \times n}$ represents a set of signals in the training dataset; $M = [M_1^T M_1 1, \ldots, M_n^T M_n 1] \in \mathbb{R}^{m^3 \times n}$ represents a set of mask matrices for all the signals in the training dataset; and $1 \in \mathbb{R}^{m^3}$ represents a vector in which all elements are 1.

Preferably, the alternating direction method of multipliers includes:

transforming the dictionary update optimization sub-problem into a constrained optimization problem by introducing an auxiliary variable Z instead of D for separating a second term and a third term which are non-convex from a first term which is convex:

$$\min_{D} \frac{1}{n} \sum_{i=1}^{n} \frac{1}{2} \|M \circ (X - DA)\|_F^2 + \beta \sum_{s=1}^{s} J(Z_s) + \gamma \|Z^T Z - I\|_F^2 \text{ s.t. } D = Z$$

wherein $Z=[Z_1, \ldots, Z_S]$, $Z_s=D_s$, $s=1, \ldots, S$ represent a sub-auxiliary variable corresponding to each dictionary;

transforming the constrained optimization problem into its augmented Lagrange function by introducing a dual variable $U \in \mathbb{R}^{m^3 \times Sm^3}$ and obtaining three suboptimization problems:

$$D^+ = \underset{D}{\operatorname{argmin}} \frac{1}{n} \sum_{i=1}^{n} \frac{1}{2} \|M \circ (X - DA)\|_F^2 + \frac{\rho}{2} \|D - Z + U\|_F^2$$

$$Z^+ = \underset{Z}{\operatorname{argmin}} \beta \sum_{s=1}^{s} J(Z_s) + \gamma \|Z^T Z - I\|_F^2 + \frac{\rho}{2} \|D - Z + U\|_F^2$$

$$U^+ = U + D - Z$$

where ρ represents an introduced penalty parameter; $D^+$, $Z^+$ and $U^+$ obtained by solving the subproblem in each iteration step are taken as the input of a next iteration step;

solving three sub-optimization problems alternately to update three variables until convergence so as to obtain the graph dictionary.

According to a second aspect of the present disclosure, a 3D point cloud signal encoding method based on graph dictionary learning is provided, wherein the graph dictionary obtained above is used to encode a 3D point cloud signal to generate a 3D point cloud signal bitstream.

Preferably, the encoding a 3D point cloud signal to generate a 3D point cloud signal bitstream includes:
performing quality layer partition on the 3D point cloud signal to obtain l quality layers;
encoding the point cloud signal in a specific quality layer to obtain a point cloud signal bitstream of the quality layer;
decoding the point cloud signal bitstream in a specific quality layer to obtain the reconstructed point cloud signal of the quality layer;
encoding and decoding l quality layers successively, and merging the point cloud signal bitstreams of l quality layers to obtain the complete 3D point cloud signal bitstream.

Preferably, the performing quality layer partition on the 3D point cloud signal to obtain l quality layers includes:
dividing the 3D point cloud into l quality layers, wherein according to the quality layers from low to high, a first layer is a base layer, l−1 layers after are enhancement layers, including a first enhancement layer up to the $(l-1)^{th}$ enhancement layer; and obtaining point cloud signals of the base layer and each enhancement layers;
for the obtained point cloud signal of l quality layers, taking a lowest quality layer obtained lastly as the base layer, and the other l−1 layers as the first to the $l-1^{th}$ enhancement layers from low to high quality.

Preferably, the obtaining point cloud signals of the base layer and each enhancement layer includes:
voxelizing point cloud data, and outputting a voxelized point cloud signal as a point cloud signal of a highest quality layer;
performing voxel block merging for l−1 times on the voxelized point cloud signal to obtain point cloud signals of l−1 different quality layers as point cloud signals of the base layer and the first to $(l-2)^{th}$ enhancement layers;
the input of each voxel block merging is the point cloud signals of the high quality layer obtained by previous voxel block merging; and the output of the point cloud signals of the low quality layer is taken as an input of a next voxel block merging.

Preferably, the voxel block merging includes:
dividing a boundary cube where a point cloud signal of the high quality layer is located into uniform c×c×c voxel blocks, where c is a preset side length of a voxel block;
merging voxels contained in each voxel block as one voxel of the point cloud signal of the lower quality layer;
reducing a maximum value of the geometric coordinates of the voxels contained in each voxel block by c times and rounding same as the geometric coordinates of the corresponding voxels in the point cloud signal of the lower quality layer;
taking average values of the attribute signals of the voxels contained in each voxel block as a value of the attribute signal of the corresponding voxel in the point cloud signal of the lower quality layer; and
obtaining the point cloud signals of the lower quality layer.

Preferably, encoding the point cloud signal in a specific quality layer to obtain a point cloud signal bitstream of the quality layer includes:
encoding geometry information, dividing the geometric coordinates of the point cloud signals according to an octree structure, allocating an eight-bit byte unit for each branch node in the octree structure to represent whether point data of a point cloud exists in a space unit corresponding to a sub-node of the branch node, traversing the octree structure in a depth-breadth first order to obtain a byte unit sequence representing the geometric coordinates of all the space units, and entropy encoding the byte unit sequence to obtain a geometry information bitstream;
inter-layer attribute prediction, and only for the enhancement layers, obtaining the predicted attribute signal in the current layer using the previous decoded layer and the geometric coordinates of the point cloud in the current layer, for attribute signal pre-processing;
attribute signal pre-processing, and dividing a boundary cube where the point cloud signal of the current layer is located into m×m×m voxel blocks uniformly according to a pre-set side length m; if the input quality layer is a base layer, averaging the values of the attribute signals of the voxels contained in each voxel block to obtain a direct current attribute signal, and subtracting the direct current attribute signal from the attribute signals of the voxels contained in each voxel block to obtain a residual attribute signal; if an input quality layer is an enhancement layer, subtracting the inter-layer prediction signal from a current layer to obtain a residual attribute signal of the current layer;
encoding the direct current attribute signal, and uniformly quantizing the direct current attribute signal of the base layer, differencing the adjacent quantized direct current attribute signal of each voxel block, and entropy encoding them to obtain a direct current attribute signal bitstreams;

encoding the residual attribute signal, performing geometry adaptive sparse coding on the residual attribute signal of each cube block by the graph dictionary and the geometric coordinates of the current layer to obtain a sparse coefficient matrix, performing uniform quantization on the sparse coefficient matrix, and performing entropy encoding on the values and positions of non-zero elements in the quantized sparse coefficient matrix respectively to obtain a residual attribute signal bitstream; and merging the point cloud signal bitstream, merging the geometry information bitstream and the attribute signal bitstream of a $l'^{th}$ quality layer to obtain the point cloud signal bitstream of the $l'^{th}$ quality layer.

Preferably, the inter-layer attribute signal prediction includes:

determining the input quality layer; if it is a base layer, performing no operation;

if it is an enhancement layer, dividing a boundary cube where the point cloud signal of the current layer is located into uniformly distributed c×c×c voxel blocks by the geometric coordinates, and predicting the attribute signals of voxels contained in each voxel block;

enlarging the geometric coordinate of each voxel of the previous quality layer point cloud signal by c times and rounding same, searching for voxels of the previous layer point cloud signal corresponding to 19 connected voxel blocks with a closest spatial distance to each voxel block, including the voxels themselves, calculating the spatial distance between the voxels contained in each voxel block and 19 voxels connected to the voxel block in the previous layer point cloud signal one by one, selecting 7 connected voxels with the closest spatial distance, and performing a weighted average on attribute signals of the 7 connected voxels with the reciprocal of the spatial distance of the 7 connected voxels as a weight to obtain the inter-layer prediction signal of voxels contained in the voxel block.

Preferably, the residual attribute signal encoding includes:

extracting the corresponding rows from the graph dictionary to form a sub-dictionary by the geometric coordinates of voxels contained in each voxel block;

normalizing the extracted sub-dictionary corresponding to each voxel block;

performing geometry adaptive sparse coding on the residual attribute signal of voxels contained in each voxel block based on a $\ell_0$ sparse regularization term by the normalized sub-dictionary to obtain a sparse coefficient matrix; and performing uniform quantization on the sparse coefficient matrix, entropy encoding on the values and positions (row coordinates and column coordinates) of non-zero elements of the quantized sparse coefficient matrix, and merging same to obtain a residual attribute signal bitstream.

Preferably, decoding the point cloud signal bitstream in a specific quality layer to obtain the reconstructed point cloud signal of the quality layer includes:

splitting the point cloud signal bitstream, splitting the point cloud signal bitstream of the $l'^{th}$ quality layer, and obtaining a geometry information bitstream and an attribute signal bitstream of the $l'^{th}$ quality layer;

decoding geometry information, and entropy decoding the geometry information bitstream to obtain an octree structure and the byte unit of each branch node bitstream, and then obtain geometric coordinates of each voxel;

performing inter-layer attribute prediction to obtain the predicted signal from a reconstructed point cloud signal of a previous quality layer;

decoding the direct current attribute signal, performing entropy decoding only on the direct current attribute signal bitstream of the base layer, adding the adjacent decoded direct current signal for each voxel block, and performing inverse uniform quantization to obtain a reconstructed direct current signal;

decoding the residual attribute signal, performing entropy decoding and inverse quantization on the residual attribute signal bitstream to obtain a reconstructed sparse coefficient matrix; by using the geometric coordinates of the voxels contained in each voxel block, extracting a corresponding rows from a graph dictionary to form a sub-dictionary, and performing normalization; multiplying the normalized sub-dictionary by a sparse vector of a corresponding voxel block in the reconstructed coefficient matrix to obtain a reconstructed residual attribute signal of voxels contained in the corresponding voxel block;

reconstructing the 3D point cloud and determining the input quality layer; if it is a base layer, adding the direct current attribute signal of the base layer and the residual attribute signal of the base layer to obtain a reconstructed attribute signal of the base layer; if it is an enhancement layer, adding the inter-layer prediction signal and the enhancement layer residual attribute signal to obtain a reconstructed attribute signal of the enhancement layer; and aligning the reconstructed attribute signal and the geometric coordinates to obtain a reconstructed point cloud signal of the current layer for single-quality layer point cloud signal encoding and point cloud signal decoding of the next enhancement layer.

According to a third aspect of the present disclosure, 3D point cloud signal decoding method based on graph dictionary learning is provided, which is used for decoding the 3D point cloud signal bitstream obtained by the 3D point cloud signal encoding method based on graph dictionary learning as described above.

intercepting point cloud signal bitstream of top l' quality layers from the 3D point cloud signal bitstream, l' being any positive integer not less than 1, sequentially corresponding to a base layer, a first enhancement layer, ..., and a $(l'-1)^{th}$ enhancement layer according to the number of layers; and according to the graph dictionary, performing single-quality layer point cloud signal decoding on the l' quality layers successively from the base layer to obtain reconstructed 3D point cloud signals corresponding to the top l' layers, l'≤l.

According to a fourth aspect of the present disclosure, a 3D point cloud compression method based on graph dictionary learning is provided, including:

obtaining point cloud data to be compressed, wherein the point cloud data to be compressed is a 3D point cloud signal;

encoding the 3D point cloud signal into a 3D point cloud signal bitstream by the above-mentioned 3D point cloud signal encoding method based on graph dictionary learning;

decoding and reconstructing the 3D point cloud signal from the 3D point cloud signal bitstream by the above-mentioned 3D point cloud signal decoding method based on graph dictionary learning.

Compared to the prior art, the present disclosure has at least one of the following advantageous effects.

According to the graph dictionary learning method for the 3D point cloud in an example of the present disclosure, the graph dictionary learning method for the 3D point cloud can effectively exploit the spatial correlation between point cloud signals to optimally remove the redundancy between point cloud signals.

The 3D point cloud encoding and decoding solution, the compression method and the device based on graph dictionary learning in the examples of the present disclosure are applicable to lossless geometry and lossy attribute compression of 3D point clouds. By performing inter-layer attribute prediction utilizing the correlation among different quality layers, it effectively improves the compression efficiency of 3D point cloud attribute signals. It not only effectively reduces encoding overhead, but also flexibly meets the practical needs of different quality of decoded signals, and it is scalable.

Compared with the analytical transform based on GFT, RAHT and geometry-guided sparse coding method based on GFT basis, the 3D point cloud encoding and decoding solution, the compression method and the device based on graph dictionary learning in the examples of the present disclosure may adaptively use statistical prior information of signals in the training dataset. It may effectively use the geometry topological correlation of the training dataset compared with a structured sparse representation coding solution based on multi-scale dictionary learning, and thus may effectively improve the reconstruction quality of the point cloud signal. Compared with the MPEG PCC standard, which only uses the geometry information to construct the attribute transform, learned graph dictionary may effectively employ both the statistical prior information and the topological structure information of attribute signals, and achieve significant performance gains

BRIEF DESCRIPTION OF THE DRAWINGS

Other features, objects and advantages of the disclosure will become more apparent from reading the detailed description of non-limiting examples with reference to the following drawings.

DETAILED DESCRIPTION OF THE INVENTION

The present disclosure will now be described in detail with reference to examples and accompanying drawings. The following examples will aid those skilled in the art in further understanding of the present disclosure, but do not limit the disclosure in any way. It should be noted that several variations and modifications can be made by a person skilled in the art without departing from the inventive concept. These are all within the scope of the present disclosure.

Figure 1:
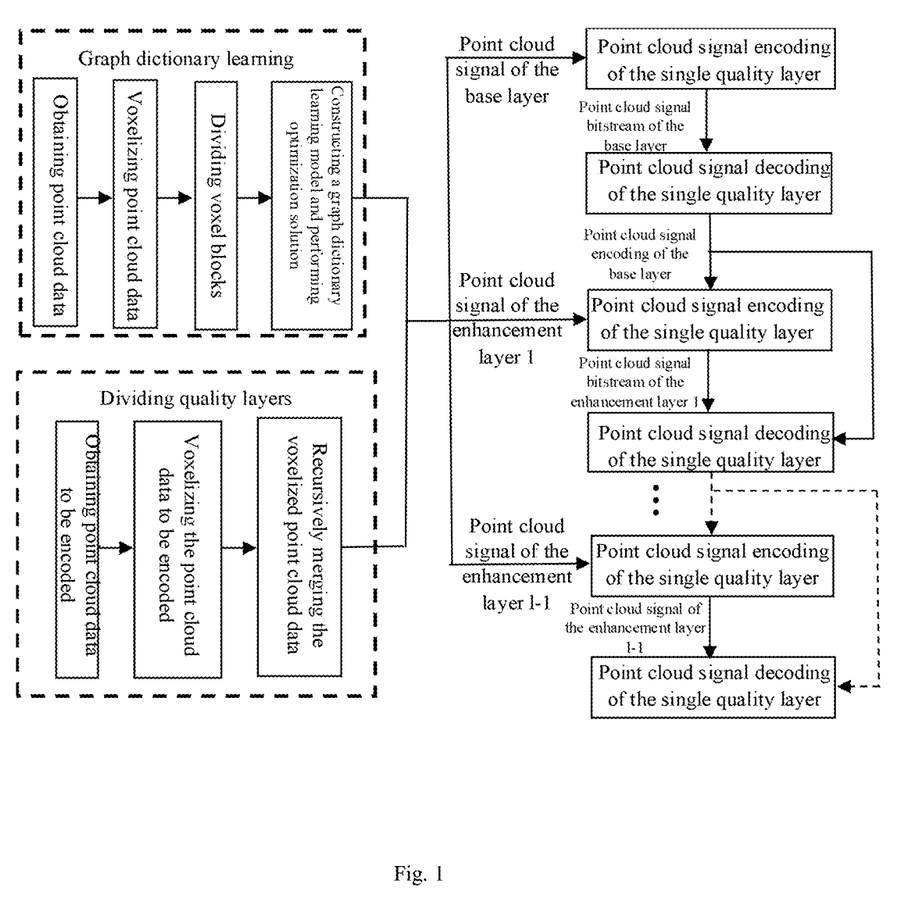
FIG. 1 is a structural block diagram of a preferred example of the present disclosure.

In the present disclosure, a graph dictionary is learned by using topology information inherent in a point cloud signal to perform an asymptotically optimal sparse representation on the point cloud signal, redundancy between signals is effectively removed, and the point cloud signal is divided into different quality layers to perform inter-layer attribute prediction coding, which not only effectively reduces coding overhead, but also flexibly meets the practical needs of different quality of decoded signals. The compression effect outperforms the existing start-of-the-art transform coding solution and the MPEG 3DG G-PCC standard solution. Based on the above-mentioned inventive concept, the present disclosure provides an example, as shown in FIG. 1. A graph dictionary learning method for a 3D point cloud includes:

S100, obtaining a training dataset of N point cloud data, including the geometric coordinates of each point, the color and the normal vector as attribute signals;

S200, voxelizing the point cloud data, dividing the point cloud data into spatial axis aligned and uniformly distributed voxels, and calculating geometric coordinates and attribute signals of each voxel to obtain the voxelized point cloud data;

S300, dividing voxel blocks, evenly dividing a boundary cube where the voxelized point cloud data is located into m×m×m voxel blocks, m being a preset side length; sorting the voxel blocks to obtain a training dataset; and

S400, constructing a graph dictionary learning model and performing an optimization solution to obtain a graph dictionary for encoding and decoding the 3D point cloud signal.

In the present example, m is taken as 8 to balance performance and computational complexity. r is 50. The total number N of point cloud data in the training dataset is 2000. 100000 blocks are extracted in total. In other examples, other parameters may also be selected. The present disclosure is not limited to the above-mentioned parameters.

In order to effectively utilize the spatial correlation between the point cloud signals and asymptotically optimally remove the redundancy between the point cloud signals, the present disclosure provides a preferred example for performing S200 voxelized point cloud data, including:

S201, recursively dividing a boundary cube where the point cloud data is located by using an octree structure. Starting from the boundary cube, it divides each cube from top to bottom into eight small cubes, successively iterating until reaching a specified division level L, obtaining a plurality of uniformly distributed leaf node cube block sets aligned with coordinate axes, and taking each non-empty leaf node cube block containing a point as a voxel. Generally, the number L of division levels of an octree is set as 9 or 10. However, in other examples, other division times may be selected. The present disclosure is not limited to the above-mentioned parameters.

S202, merging points contained by each voxel. When calculating a geometric coordinate and an attribute signal of each voxel, the geometric coordinate of the central position of the leaf node cube block corresponding to each voxel is rounded and quantized into an integer as the geometric coordinate of the merged voxel, and an average value of the attribute signals of the points contained in the leaf node cube block corresponding to each voxel is taken as the attribute signal of the merged voxel.

In an example of the present disclosure, the voxel blocks are sorted in S300 to obtain a training dataset, including: sorting all the voxel blocks of the point cloud data in descending order according to the number of contained voxels, selecting top r voxel blocks containing the most number of voxels, calculating an average value of the attribute signals of the voxels contained in each voxel block as a direct current attribute signal of the voxel block, and subtracting the direct current attribute signal from each voxel to obtain a residual attribute signal as a training signal, so as to form a training dataset for graph dictionary learning. Herein, r is a preset positive integer.

The present disclosure provides a preferred example for performing S400 to construct a graph dictionary learning model and perform an optimization solution so as to obtain a graph dictionary for encoding and decoding a 3D point cloud signal. The constructing the graph dictionary learning model based on a nonlinear p-Laplacian operator includes:

S401, taking signals of the training dataset as a graph signal to construct a topology-connected graph structure $\mathcal{G} = (V, \varepsilon, W)$, wherein the V represents a set of $m^3$ nodes; $\varepsilon$ represents a set of edges connecting the $m^3$ nodes; and $W \in \mathbb{R}^{m^3 \times m^3}$ represents a weight matrix of the edges; in the present example, a $\epsilon$-neighborhood graph connected structure $\mathcal{G} = (V, \varepsilon, W)$ is constructed according to a spatial position relationship, namely, given a threshold value $\epsilon$; if the distance between two nodes of the graph signal is less than the threshold value, the two nodes are connected to form an edge of the graph structure, and a weight value of 1 is assigned to the edge; otherwise, the two nodes are not connected, wherein 1 is taken for $\epsilon$; of course, in other examples, other graph construction solutions or other threshold parameters may also be selected, and the present disclosure is not limited to the above-mentioned graph construction solutions and parameter settings;

S402, constructing a graph dictionary learning model by using the eigen-basis function of the p-Laplacian operator of the constructed graph structure, and optimizing the objective function based on the $\ell_1$ norm sparse penalty term:

$$\min_{D,A} \frac{1}{n} \sum_{i=1}^{n} \frac{1}{2} \|M_i(x_i - D\alpha_i)\|_2^2 + \beta \sum_{s=1}^{s} J(D_s) + \gamma \|D^T D - I\|_F^2 + \frac{\lambda}{n} \sum_{i=1}^{n} \|\alpha_i\|_1$$

where $x_i \in \mathbb{R}^{m^3}$ represents an $i^{th}$ training voxel block; $M_i \in \mathbb{R}^{m_i \times m^3}$ represents a mask matrix with each element having a value of 0 or 1 used for extracting a corresponding $m_i$ voxels from $x_i$; $D \in \mathbb{R}^{m^3 \times Sm^3}$ represents an overcomplete graph dictionary composed of S complete sub-dictionaries, namely, $$D = [D_1, \ldots, D_s]; J(D_s) = \sum_k \frac{\sum_{ij} w_{ij} |d_{ski} - d_{skj}|^{p_s}}{2\|d_{sk}\|_{p_s}^{p_s}}$$

is used for for constraining an eigen-basis of the p-Laplacian operator corresponding to the complete sub-dictionary; $w_{ij}$ represents an element in an $i^{th}$ row and a $j^{th}$ column of a weight matrix; $d_{sk}$ represents a $k^{th}$ atom in an $s^{th}$ sub-dictionary; $A \in \mathbb{R}^{Sm^3 \times n}$ represents a sparse coefficient matrix;

$\alpha_i \in \mathbb{R}^{Sm^3}$ represents a sparse coefficient of a signal $x_i$ representing a column vector of the sparse coefficient matrix A on a graph dictionary D; $I \in \mathbb{R}^{Sm^3 \times Sm^3}$ represents an unit matrix; n=Nr is the number of voxel blocks of the training dataset; $p_s$ represents a power index parameter corresponding to an $s^{th}$ sub-dictionary; $\beta$, $\gamma$ and $\lambda$ represent corresponding regularization parameters; $\|\cdot\|_p$ represents a $\ell_p$ norm of the vector; and $\|\cdot\|_F$ represents a Frobenius norm of the matrix.

The first term in the learning objective function of the graph dictionary represents a data fitting term, so that the graph dictionary and the corresponding sparse code fit the original data. The second term represents a constraint on the eigen-basis of the p-Laplacian operator, which is used to constrain the topologically connected structure of the graph dictionary, so that the learned graph dictionary keeps the same topology as possible to the original signal. The third term represents a constraint on the orthogonality of the graph dictionary so as to remove the correlation between atoms of the graph dictionary. The fourth term is a sparse regular term used to constrain the sparsity of the obtained coefficients.

S403, iteratively optimizing the learning objective function of the graph dictionary, and in each iteration, alternately solving a geometry adaptive sparse coding sub-problem by fixing dictionary D and solving a graph dictionary update sub-problem with a fixed sparse coefficient matrix A until a predetermined number of iterations, so as to obtain the graph dictionary. Specifically, it includes:

S4031, according to the graph dictionary D obtained by solving the graph dictionary update sub-problem, solving a geometry adaptive sparse coding sub-problem to obtain a sparse coefficient matrix A:

$$\min_{\alpha_i} \frac{1}{2} \|M_i(x_i - D\alpha_i)\|_2^2 + \lambda \|\alpha_i\|_1, \quad i = 1, 2, \ldots, n$$

here, the geometry adaptive sparse coding sub-problem may be solved by using a common $\ell_1$ norm-constrained sparse coding method, including but not limited to least angle regression (LARS), basis pursuit (BP), iterative shrinking threshold method (ISTA), alternating direction method of multipliers (ADMM), etc; in this example, a least angle regression (LARS) method is selected for solving;

S4032, according to a fixed sparse coefficient matrix A obtained by solving a geometry adaptive sparse coding sub-problem, solving a graph dictionary update sub-problem by an alternating direction method of multipliers so as to obtain a graph dictionary D:

$$\min_D \frac{1}{n} \sum_{i=1}^{n} \frac{1}{2} \|M \circ (X - DA)\|_F^2 + \beta \sum_{s=1}^{s} J(D_s) + \gamma \|D^T D - I\|_F^2$$

where $\circ$ represents a Hadamard product of element-by-element multiplication; $X=[x_1, \ldots, x_n] \in \mathbb{R}^{m^3 \times n}$ represents a set of signals in the training dataset; $M=[M_1^T M_1 1, \ldots, M_n^T M_n 1] \in \mathbb{R}^{m^3 \times n}$ represents a set of mask matrices for all the signals in the training dataset; and $1 \in \mathbb{R}^{m^3}$ represents a vector in which all elements are 1.

Further, the alternating-direction method of multipliers includes:

transforming into a constrained optimization problem by introducing an auxiliary variable Z instead of D for separating a second term and a third term which are non-convex from a first term which is convex in the dictionary update optimization sub-problem:

$$\min_D \frac{1}{n}\sum_{i=1}^{n}\frac{1}{2}\|M \circ (X - DA)\|_F^2 + \beta\sum_{s=1}^{s}J(Z_s) + \gamma\|Z^T Z - I\|_F^2 \quad \text{s.t.} \quad D = Z$$

wherein, $Z=[Z_1, \ldots, Z_S]$, $Z_s=D_s$, $s=1, \ldots, S$ represent a sub-auxiliary variable corresponding to each dictionary;

By transforming the constrained optimization above into its augmented Lagrange function by introducing a dual variable $U \in \mathbb{R}^{m^3 \times Sm^3}$ so as to obtain three suboptimization problems:

$$D^+ = \operatorname*{argmin}_D \frac{1}{n}\sum_{i=1}^{n}\frac{1}{2}\|M \circ (X - DA)\|_F^2 + \frac{\rho}{2}\|D - Z + U\|_F^2$$

$$Z^+ = \operatorname*{argmin}_Z \beta\sum_{s=1}^{s}J(Z_s) + \gamma\|Z^T Z - I\|_F^2 + \frac{\rho}{2}\|D - Z + U\|_F^2$$

$$U^+ = U + D - Z$$

where ρ represents an introduced penalty parameter; $D^+$, $Z^+$ and $U^+$ obtained by solving in each iteration step are taken as the input of a next iteration step;

solving three sub-optimization problems alternately to update three variables until convergence so as to obtain the graph dictionary.

In this example, in order to eliminate the computationally complex Hadamard product, D may be subject to parallel solution by directly obtaining an analytical solution through the elements of each row of the Hadamard product. Since the Z sub-optimization problem is non-convex, the stochastic gradient descent algorithm is selected for solutions.

The above-mentioned examples of the present disclosure effectively use topological structure correlation between point cloud signals to learn a graph dictionary, and asymptotically optimally removing redundancy between signals for the point cloud signals so as to improve encoding efficiency.

Based on the same inventive concept, an example of the present disclosure also provides a 3D point cloud encoding method based on graph dictionary learning. The graph dictionary encodes a 3D point cloud signal to generate a 3D point cloud signal bitstream. The 3D point cloud signal bitstream may be truncated into l quality layers, l being any positive integer. Any top l' quality layers may be decoded to obtain a reconstructed 3D point cloud signal of different quality. It includes:

S1, quality layer division, dividing the 3D point cloud data into l quality layers, wherein according to the quality layers from low to high, a first layer is a base layer, l–1 layers after the first layer are enhancement layers, respectively including a first enhancement layer up to the $(l-1)^{th}$ enhancement layer; and respectively obtaining point cloud signals of the base layer and each of the enhancement layers;

S2, encoding a point cloud signal of a single quality layer, encoding an input point cloud signal of the $l'^{th}$ (1≤l'≤l) quality layer, wherein geometric coordinates are losslessly encoded, and generating a geometric coordinate bitstream of the $l'^{th}$ quality layer; lossy encoding the attribute signal by a graph dictionary and geometric coordinates to generate an attribute signal bitstream of the $l'^{th}$ quality layer; merging the geometry information bitstream and the attribute signal bitstream of the $l'^{th}$ quality layer to obtain a point cloud signal bitstream of the $l'^{th}$ quality layer;

S3, decoding a single quality layer point cloud signal, splitting a point cloud signal bitstream of the $l'^{th}$ (1≤l'≤l) quality layer, and obtaining a geometry information bitstream and an attribute signal bitstream of the $l'^{th}$ quality layer; obtaining geometric coordinates by decoding from the geometry information bitstream of the $l'^{th}$ quality layer; decoding the attribute signal bitstream of the $l'^{th}$ quality layer by using the geometric coordinates of the $l'^{th}$ quality layer and the graph dictionary to obtain a reconstructed attribute signal of the $l'^{th}$ quality layer; merging the geometric coordinates and the reconstructed attribute signal of the $l'^{th}$ quality layer as a reconstructed point cloud signal of the $l'^{th}$ quality layer for encoding and decoding the point cloud signal of the $(l'+1)^{th}$ quality layer; and S4, encoding and decoding l quality layers successively, and merging the point cloud signal bitstream of l quality layers to obtain the 3D point cloud signal bitstream. In the present example, l is taken as 3. However, other levels may be used in other examples. The present disclosure is not limited to the above-described level arrangement.

The above-mentioned examples of the present disclosure effectively improve the compression efficiency of 3D point cloud attribute signals. It not only effectively reduces coding expense, but also flexibly meets the actual needs of different quality of decoded signals.

As shown in FIG. 1, in a preferred example, the S1 quality layer division process includes:

S11, voxelizing point cloud data, and outputting a voxelized point cloud signal as a point cloud signal of a highest quality layer; specifically, dividing a boundary cube where a point cloud signal of the high quality layer is located into uniformly distributed c×c×c voxel blocks, where c is a side length of a preset voxel block;

S12, performing voxel block merging for l–1 times on the voxelized point cloud signal to obtain point cloud signals of different quality layers, wherein the input of each voxel block merging is the point cloud signals of the high quality layer obtained by previous voxel block merging; and the output of the point cloud signals of the low quality layer is taken as an input of a next voxel block merging; specifically, it includes:

merging the voxels contained in each voxel block as one voxel of the point cloud signal of the lower quality layer; reducing a maximum value of the geometric coordinates of the voxels contained in each voxel block by c times and rounding same as the geometric coordinates of the corresponding voxels in the point cloud signal of the lower quality layer; and taking average values of the attribute signals of the voxels contained in each voxel block as a value of the attribute signal of the corresponding voxel in the point cloud signal of the lower quality layer so as to obtain the point cloud signal of the lower quality layer.

S13, for the obtained point cloud signal of l quality layers, the taking a lowest quality layer obtained lastly as the base layer, and the other l–1 layers as the first to the l–1$^{th}$ enhancement layers from low to high quality.

The difference between adjacent quality layer point cloud signals is determined by different sizes of c. The larger the c is, the larger the difference between quality layer signals is. The inter-layer prediction effect will be worse, and the value of residual attribute signal will be larger. In this example c is preferably 2 to reduce the prediction residual between adjacent quality layers and improve compression performance.

Figure 2:
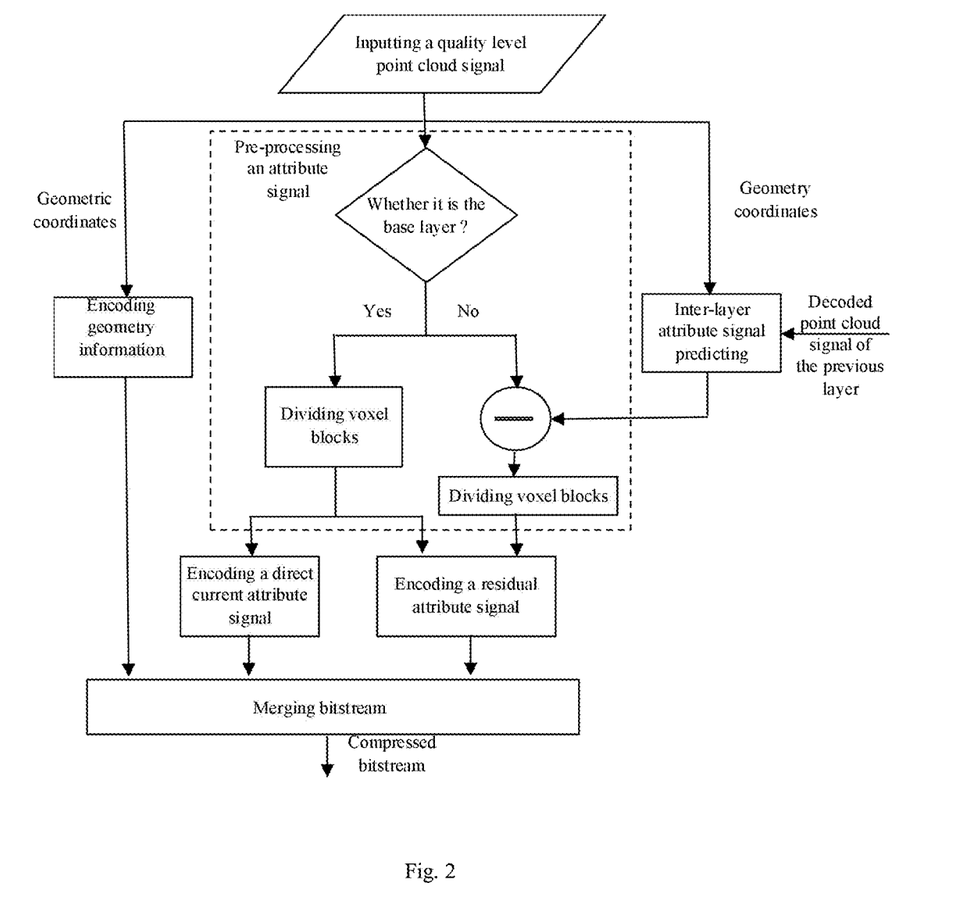
FIG. 2 is a structural block diagram illustrating the encoding of a single quality layer point cloud signal according to an example of the present disclosure.

As shown in FIG. 2, a preferred example includes, S2, encoding a point cloud signal of a single quality layer, encoding an input point cloud signal of the l'$^{th}$ (1≤l'≤l) quality layer, wherein geometric coordinates are losslessly encoded, and generating a geometric coordinate bitstream of the l'$^{th}$ quality layer; lossy encoding the attribute signal by a graph dictionary and geometric coordinates to generate an attribute signal bitstream of the l'$^{th}$ quality layer; merging the geometry information bitstream and the attribute signal bitstream of the l'$^{th}$ quality layer to obtain a point cloud signal bitstream of the l'$^{th}$ quality layer.

Specifically, the single quality layer point cloud signal encoding includes: encoding geometry information, predicting an inter-layer attribute signal, pre-processing an attribute signal, encoding a direct current signal and encoding a residual attribute signal, and merging a point cloud signal bitstream.

S21, the encoding geometry information includes dividing the geometric coordinates of the point cloud signals according to an octree structure, allocating an eight-bit byte unit for each branch node in the octree structure to represent whether point data of a point cloud exists in a space unit corresponding to a sub-node of the branch node, traversing the octree structure in a depth-breadth priority order to obtain a byte unit sequence representing the geometric coordinates of all the space units, and entropy encoding the byte unit sequence to obtain a geometry information bitstream;

S22, the predicting an inter-layer attribute signal includes no operation on the input base layer, and reconstructing the point cloud signal by a decoded previous layer and the geometric coordinates of the point cloud signal of a current layer only for the enhancement layer so as to obtain an inter-layer prediction signal of the attribute signal of the current layer for attribute signal pre-processing;

S23, the pre-processing an attribute signal includes dividing a boundary cube where the point cloud signal of the current layer is located into m×m×m voxel blocks uniformly according to a pre-set side length m; if the input quality layer is a base layer, averaging the values of the attribute signals of the voxels contained in each voxel block to obtain a direct current attribute signal, and subtracting the direct current attribute signal from the attribute signals of the voxels contained in each voxel block to obtain a residual attribute signal; if an input quality layer is an enhancement layer, subtracting the inter-layer prediction signal from a current layer attribute signal to obtain a prediction residual of an attribute signal of the current layer;

S24, the encoding the direct current attribute signal includes only operation on the base layer, uniformly quantizing only the direct current attribute signal of the base layer, differencing the quantized direct current attribute signal of each voxel block and an adjacent voxel block, and entropy encoding the same to obtain a direct current attribute signal bitstream;

S25, the encoding the residual attribute signal includes performing geometry adaptive sparse coding on the residual attribute signal of each cube block by the graph dictionary and the geometric coordinates of the current layer to obtain a sparse coefficient matrix, performing uniform quantization on the sparse coefficient matrix, and performing entropy encoding on the values and positions of non-zero elements in the quantized sparse coefficient matrix respectively to obtain a residual attribute signal bitstream; and S26, the merging the point cloud signal bitstream includes merging the geometry information bitstream and the attribute signal bitstream of an l'$^{th}$ quality layer to obtain the point cloud signal bitstream of the l'$^{th}$ quality layer.

Figure 4:
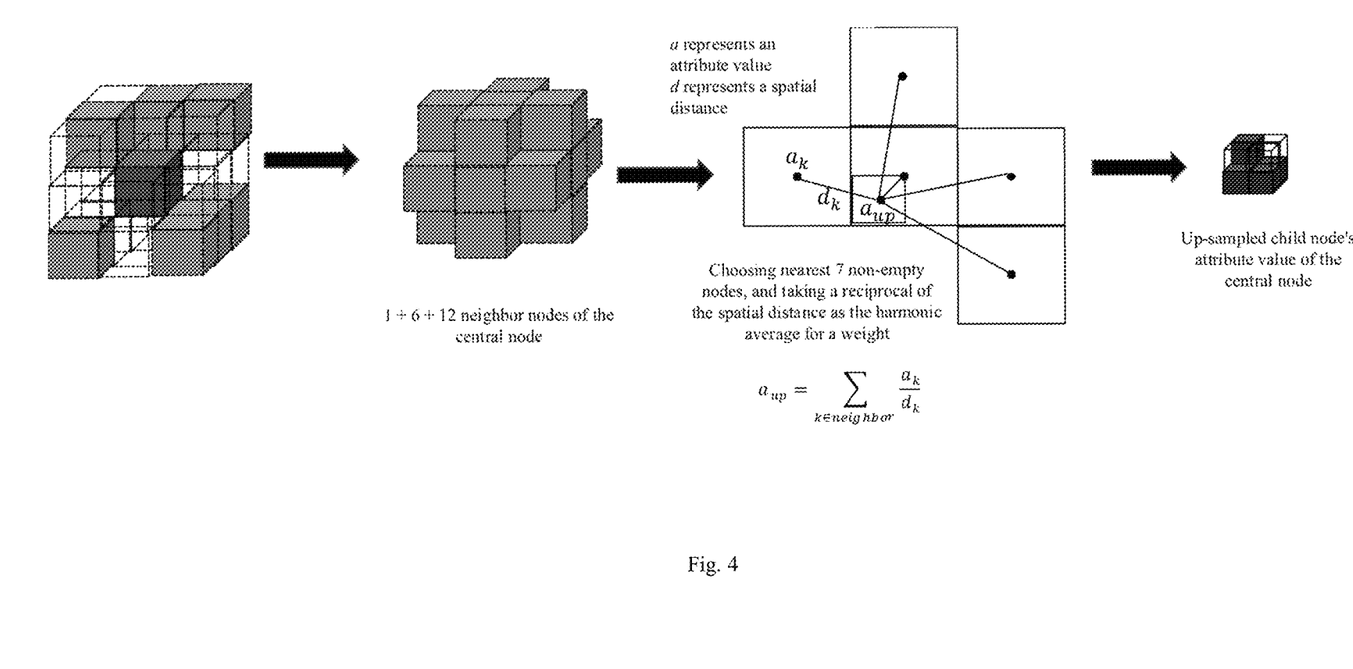
FIG. 4 is a structural block diagram illustrating inter-layer attribute signal prediction according to an example of the present disclosure.

Further, the process of S22 inter-layer attribute signal prediction includes:

S221, determining the input quality layer; if it is a base layer, performing no operation;

S222, if it is an enhancement layer, dividing a boundary cube where the point cloud signal of the current layer is located into uniformly distributed voxel blocks by the geometric coordinates, and predicting the attribute signals of voxels contained in each voxel block; and S223 calculating the spatial distance between the voxels contained in each voxel block and 19 voxel blocks connected to the voxel block in the previous layer point cloud signal one by one, selecting 7 connected voxel blocks with the closest spatial distance, and performing a weighted average on attribute signals of the 7 connected voxels with the reciprocal of the spatial distance of the 7 connected voxel blocks as a weight to obtain the inter-layer prediction signal of voxels contained in the voxel block.

In the present example, c is preferably 2 to reduce the prediction residual between adjacent quality layers and improve compression performance.

Specifically, the specific operation of S25 residual attribute signal encoding includes:

S251, extracting the corresponding rows from the graph dictionary to form a sub-dictionary by the geometric coordinates of voxels contained in each voxel block;

S252, normalizing the extracted sub-dictionary corresponding to each voxel block;

S253, performing geometry adaptive sparse coding on the residual attribute signal of voxels contained in each voxel block based on a sparsity regularization term by the normalized sub-dictionary to obtain a sparse coefficient matrix;

$$\min_{\alpha_i} \frac{1}{2}\|M_i(x_i - D\alpha_i)\|_2^2 + \lambda\|\alpha_i\|_1, \quad i = 1, 2, \ldots, n$$

here, the common $\ell_0$ norm-constrained sparse coding methods may be used for solving, including but not limited to matching pursuit (MP), orthogonal matching pursuit (OMP) and iterative hard threshold method (IHT); in the present example, the solution method uses an orthogonal matching pursuit method; however, in other examples, other solution methods may also be selected, and the present disclosure is not limited to the above-mentioned solution method;

S254, performing uniform quantization on the sparse coefficient matrix, entropy encoding on the values and positions (row coordinates and column coordinates) of non-zero elements of the quantized sparse coefficient matrix, and merging same to obtain a residual attribute signal bitstream.

Figure 3:
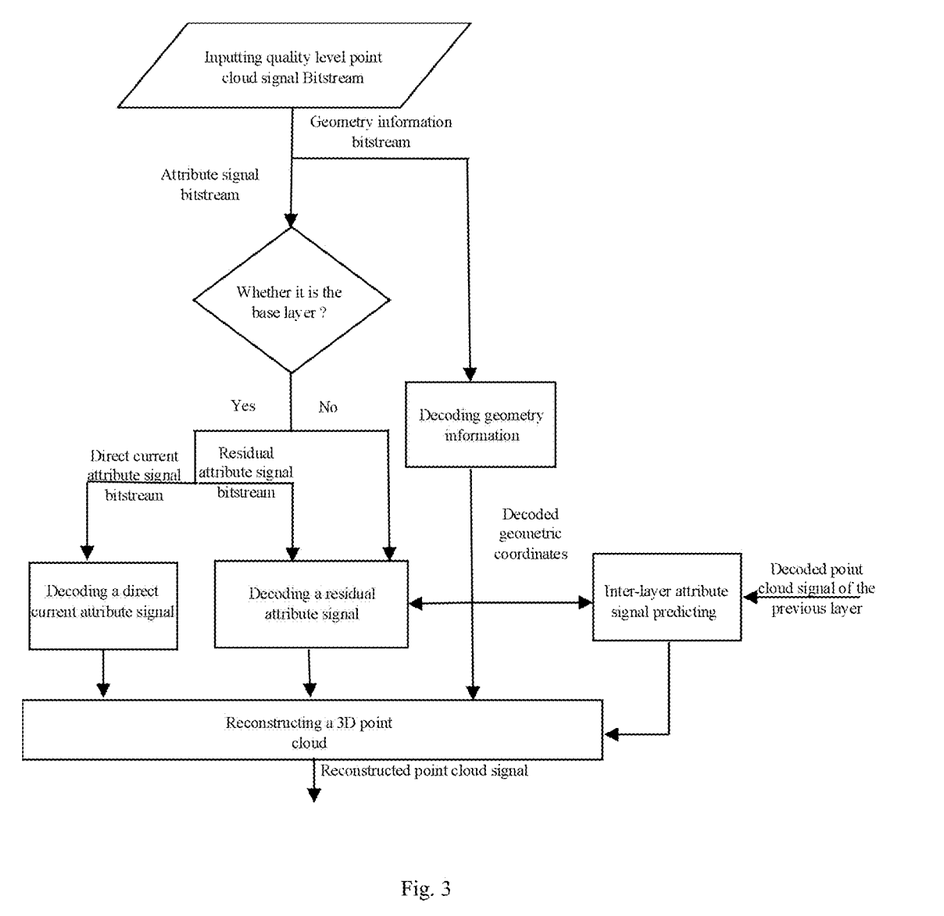
FIG. 3 is a structural block diagram illustrating the decoding of a single quality layer point cloud signal according to an example of the present disclosure.

As shown in FIG. 3, a preferred example includes, S3, decoding a single quality layer point cloud signal and obtaining a reconstructed point cloud signal of the quality layer where the point cloud signal is located, including: splitting a point cloud signal bitstream of the l'$^{th}$ quality layer, and obtaining a geometry information bitstream and an attribute signal bitstream of the l'$^{th}$ quality layer; obtaining geometric coordinates by decoding from the geometry information bitstream of the l'$^{th}$ quality layer; decoding the attribute signal bitstream of the l'$^{th}$ quality layer by using the geometric coordinates of the l'$^{th}$ quality layer and the graph dictionary to obtain a reconstructed attribute signal of the l'$^{th}$ quality layer; merging the geometric coordinates and the reconstructed attribute signal of the l'$^{th}$ quality layer as a reconstructed point cloud signal of the l'$^{th}$ quality layer for encoding and decoding the point cloud signal of the (l'+1)$^{th}$ quality layer.

Specifically, it includes splitting a point cloud signal bitstream, decoding geometry information, predicting an interlayer attribute signal, decoding a direct current attribute signal, decoding a residual attribute signal and reconstructing a 3D point cloud, including:

S31, splitting the point cloud signal bitstream, splitting the point cloud signal bitstream of the l'$^{th}$ quality layer, and obtaining a geometry information bitstream and an attribute signal bitstream of the l'$^{th}$ quality layer;

S32, decoding geometry information, entropy decoding the geometry information bitstream to obtain an octree structure and a byte unit of each branch node, and then obtain geometric coordinates of each voxel;

S33, predicting the inter-layer attribute signal, as above, to obtain an inter-layer prediction signal from a reconstructed point cloud signal of a previous quality layer;

S34, decoding direct current signal, only operating on the base layer, performing entropy decoding on the direct current signal bitstream of the base layer, and performing inverse uniform quantization after successively adding signal values of adjacent sequences obtained by decoding to obtain a reconstructed direct current signal;

S35, decoding the residual attribute signal, performing entropy decoding and inverse quantization on the residual attribute signal bitstream to obtain a reconstructed sparse coefficient matrix; by using the geometric coordinates of the voxels contained in each voxel block, extracting a corresponding row of a graph dictionary to form a sub-dictionary, and performing normalization; multiplying the normalized sub-dictionary by a sparse vector of a corresponding voxel block in the reconstructed coefficient matrix to obtain a reconstructed residual attribute signal of voxels contained in the corresponding voxel block;

S36, reconstructing the 3D point cloud and determining the input quality layer; if it is a base layer, adding the direct current attribute signal of the base layer and the residual attribute signal of the base layer to obtain a reconstructed attribute signal of the base layer; if it is an enhancement layer, adding the inter-layer predicted signal and the enhancement layer residual attribute signal to obtain a reconstructed attribute signal of the enhancement layer; and aligning the reconstructed attribute signal and the geometric coordinates to obtain a reconstructed point cloud signal of the current layer for single-quality layer point cloud signal encoding and point cloud signal decoding of the next enhancement layer.

The point cloud data to be coded has a total of l quality layers, including a base layer, an enhancement layer 1, . . . , an enhancement layer l−1 respectively according to the quality from low to high. A reconstruction result of the lowest quality for a 3D point cloud signal may be obtained by decoding the point cloud signal bitstream of the base layer. According to the enhancement layer from low to high, a reconstruction result of higher quality for the 3D point cloud signal may be obtained each time an enhancement layer is introduced, until a reconstruction result of the highest quality for the 3D point cloud signal is obtained by using all the l quality layers. In a practical application, the top l' quality layers may be selected for transmission and decoding according to the bit rate of each quality layer according to the limitation of the transmission bit rate, providing the best reconstruction quality at the transmission bit rate.

Based on the above-mentioned inventive concept, the example of the present disclosure also provides a 3D point cloud decoding method based on graph dictionary learning, where the point cloud signal bitstream of the previous l' quality layers are intercepted from a 3D point cloud signal bitstream, l' being any positive integer not less than 0; the point cloud signal bitstream of each quality layer is decoded according to the graph dictionary to obtain a reconstructed 3D point cloud signal having different qualities, including:

S01, intercepting a point cloud signal bitstream of the previous l' layers (l'≤l) of the 3D point cloud signal bitstream, successively corresponding to a base layer, a first enhancement layer, . . . , an l'−1$^{th}$ enhancement layer according to the number of layers;

S02, performing single-quality layer point cloud signal decoding on the l' quality layers successively from the base layer to obtain reconstructed 3D point cloud signals corresponding to the top l'(l'≤l) layers.

According to the various modules in the above-mentioned system, the adopted technology may refer to the implementation technology corresponding to the steps in the above-mentioned example of the 3D point cloud encoding method based on graph dictionary learning, and will not be described in detail herein.

Based on the same inventive concept, as shown in FIG. 1, the example of the present disclosure also provides a 3D point cloud compression method based on graph dictionary learning, including:

S001, obtaining point cloud data to be coded, wherein the point cloud data to be coded is a 3D point cloud signal;

S002, encoding the 3D point cloud signal into a 3D point cloud signal bitstream by the 3D point cloud signal encoding method based on graph dictionary learning in the above-mentioned example;

S003, decoding and reconstructing the 3D point cloud signal from the 3D point cloud signal bitstream by the 3D point cloud signal decoding method in the above-mentioned example based on graph dictionary learning.

For each step in the above-mentioned compression method, the adopted technology may refer to the graph dictionary learning method for the 3D point cloud and the implementation technology corresponding to the steps in the example of the 3D point cloud encoding and decoding method based on graph dictionary learning. The description thereof will not be repeated here.

Parts of the present disclosure not specifically described in the above examples may be implemented using conventional techniques.

On the basis of the 3D point cloud compression system of the above examples, the following description is given in conjunction with specific application examples. The key parameters in this example are set as below. According to the general test conditions of MPEG PCC, the test point cloud data used in the experiment includes 5 half-body point cloud data with levels of 512×512×512 from the MUVB dataset. The training data is obtained from a large number of datasets, and the training data does not coincide with the test data sets. Since the human eye is more sensitive to changes in the luminance information of the image, the original point cloud is converted from the RGB color space to the YUV color space. The number of sub-dictionaries is set to S=2. The training parameters p corresponding to each sub-dictionary is set to 1.2 and 2.1. The regularization parameter sum is set to 10, 2 and 60 respectively. The initial dictionary is an Graph Fourier basis corresponding to the graph structure. The graph dictionary learning method performs 20 epochs on the training dataset, with 500 iterations of ADMM per epoch.

The system using the above-mentioned examples of the present disclosure compresses test point cloud data, and calculates average BD-PSNR and BD-Rate as a measurement of compression performance. A larger BD-PSNR represents a better reconstruction quality of a compression system, and a smaller BD-Rate represents a more bit rate saving of the compression system.

Compared with the method proposed by R. L. de Queiroz (TIP2016), the system of the present example obtains an average BD-PSNR gain of 4.50 dB on all the test data, and the average BD-Rate is −59.04%, representing the saved 59.04% bit rate of the present method. Compared with the method proposed by S. Gu (TIP2020), the system of the present example obtains an average BD-PSNR gain of 1.99 dB on all the test data, and the average BD-Rate is −28.14%, representing the saved 28.14% bit rate of the present method. Compared with the method proposed by Y. Shen (TCSVT2020), the system of the present example obtains an average BD-PSNR gain of 2.22 dB on all the test data, and the average BD-Rate is −36.62%, representing the saved 36.62% bit rate of the present method. Compared to the currently state-of-the-art MPEG 3DG International Point Cloud Compression standard G-PCC, the system of the present example achieves an average BD-PSNR gain of 0.14 dB over all test data and an average BD-Rate of −3.88%, representing a 3.88% bit rate savings over the method.

Experiments show that the compression efficiency of the above-mentioned example system of the present disclosure is significantly better than the method proposed by R. L. de Queiroz, S. Gu and Y. Shen, which may significantly improve the reconstruction performance and save the coding bit rate compared with the international point cloud compression standard G-PCC.

Specific examples of the disclosure have been described above. It should be understood that the present disclosure is not limited to the specific embodiments described above, and that various changes and modifications within the scope of the claims may be made by those skilled in the art without affecting the spirit of the present disclosure.

What is claimed is:

1. A graph dictionary learning method for a 3D point cloud, comprising:
    obtaining a training dataset of N point cloud data;
    performing voxelization process on the N point cloud data of the training dataset to obtain voxelized point cloud data of the training dataset;
    performing voxel block division on the voxelized point cloud data of the training dataset, selecting a plurality of voxel blocks as a training dataset for the graph dictionary learning, constructing a graph dictionary learning model according to the training dataset, and establishing a graph dictionary learning objective function; and
    performing iterative optimization on the graph dictionary learning objective function to obtain a graph dictionary for encoding and decoding a 3D point cloud signal;
    wherein the performing voxel block division on the voxelized point cloud data of the training dataset and selecting a plurality of voxel blocks as a training dataset for the graph dictionary learning comprises:
    uniformly dividing a boundary cube where all the voxelized point cloud data of the training dataset is located into m×m×m voxel blocks, m being a pre-set side length;
    sorting all the voxel blocks of each point cloud data of the training dataset in descending order according to the number of contained voxels;
    selecting top r voxel blocks containing the most number of voxels from each point cloud data of the training dataset, and calculating an average value of the attribute signals of the voxels contained in each voxel block in the top r voxel blocks as a direct current attribute signal of the voxel block, r being a pre-set positive integer; and
    subtracting the direct current attribute signal from each voxel to obtain a residual attribute signal as a training signal, forming a training dataset for graph dictionary learning.

2. A graph dictionary learning method for a 3D point cloud, comprising:
    obtaining a training dataset of N point cloud data;
    performing voxelization process on the N point cloud data of the training dataset to obtain voxelized point cloud data of the training dataset;
    performing voxel block division on the voxelized point cloud data of the training dataset, selecting a plurality of voxel blocks as a training dataset for the graph dictionary learning, constructing a graph dictionary learning model according to the training dataset, and establishing a graph dictionary learning objective function; and
    performing iterative optimization on the graph dictionary learning objective function to obtain a graph dictionary for encoding and decoding a 3D point cloud signal;
    wherein the constructing a graph dictionary learning model according to the training dataset, and establishing a graph dictionary learning objective function comprises:
    constructing a topology-connected graph structure $\mathcal{G} = (V, \varepsilon, W)$ by regarding a signal in the training dataset as a graph signal, wherein V represents a set with $m^3$ nodes; $\varepsilon$ represents a set of edges connecting $m^3$ nodes; $W \in \mathbb{R}^{m^3 \times m^3}$ represents a weight matrix of the edges;
    constructing a graph dictionary learning model by using the eigen-basis function of p-Laplacian operator of a topology-connected graph structure to establish a graph dictionary learning objective function:

$$\min_{D,A} \frac{1}{n}\sum_{i=1}^{n}\frac{1}{2}\|M_i(x_i - D\alpha_i)\|_2^2 + \beta\sum_{s=1}^{s}J(D_s) + \gamma\|D^TD - I\|_F^2 + \frac{\lambda}{n}\sum_{i=1}^{n}\|\alpha_i\|_1$$

where $x_i \in \mathbb{R}^{m^3}$ represents an $i^{th}$ training voxel block; $M_i \in \mathbb{R}^{m_i \times m^3}$ represents a mask matrix with each element having a value of 0 or 1 used for extracting a corresponding $m_i$ voxels from $x_i$; $D \in \mathbb{R}^{m^3 \times Sm^3}$ represents an overcomplete graph dictionary composed of S complete sub-dictionaries, namely, $D = [D_1, \ldots, D_S]$;

$$J(D_s) = \sum_k \frac{\sum_{ij} w_{ij}|d_{ski} - d_{skj}|^{p_s}}{2\|d_{sk}\|_{p_s}^{p_s}}$$

is used for constraining an eigen-basis of p-Laplacian operator corresponding to the complete sub-dictionary $D_s$; $W_{ij}$ represents an element in an $i^{th}$ row and a $j^{th}$ column of a weight matrix W; $d_{sk}$ represents a $k^{th}$ atom in an $s^{th}$ sub-dictionary; $A \in \mathbb{R}^{Sm^3 \times n}$ represents a sparse coefficient matrix; $\alpha_i \in \mathbb{R}^{Sm^3}$ represents a sparse coefficient of a signal $x_i$ representing a column vector of the sparse coefficient matrix A on a graph dictionary D; $I \in \mathbb{R}^{Sm^3 \times Sm^3}$ represents an unit matrix; n=Nr is the number of voxel blocks of the training dataset; $p_s$ represents a power index parameter corresponding to the $s^{th}$ sub-dictionary; $\beta$, $\gamma$ and $\lambda$ represent corresponding regularization parameters; $\|\cdot\|_p$ represents an $\ell_p$ norm of the vector; and $\|\cdot\|_F$ represents a Frobenius norm of the matrix.

3. The graph dictionary learning method for the 3D point cloud according to claim 2, wherein the performing iterative optimization on the objective function of the graph dictionary learning model to obtain a graph dictionary for encoding and decoding a 3D point cloud signal comprises:
performing iterative optimization on the graph dictionary learning objective function to obtain a graph dictionary, wherein in each iteration, alternately solving a geometry adaptive sparse coding sub-problem by a fixed dictionary D and solving a graph dictionary update sub-problem by a fixed sparse coefficient matrix A until reaching a predetermined number of iterations, and obtaining a graph dictionary for encoding and decoding the 3D point cloud signal.

4. The graph dictionary learning method for the 3D point cloud according to claim 3, wherein the performing iterative optimization on the graph dictionary learning objective function to obtain a graph dictionary comprises:
according to the fixed graph dictionary D obtained by solving the graph dictionary update sub-problem, solving geometry adaptive sparse coding sub-problems one by one for each voxel block of the training dataset to obtain a sparse coefficient matrix A;

$$\min_{\alpha_i} \frac{1}{2}\|M_i(x_i - D\alpha_i)\|_2^2 + \lambda\|\alpha_i\|_1, \ i = 1, 2, \ldots, n$$

according to the fixed sparse coefficient matrix obtained by solving the geometry adaptive sparse coding sub-problem, solving the graph dictionary updating sub-problem by an alternating direction method of multipliers so as to obtain a graph dictionary;

$$\min_D \frac{1}{n}\sum_{i=1}^{n}\frac{1}{2}\|M \circ (X - DA)\|_F^2 + \beta\sum_{s=1}^{s}J(D_s) + \gamma\|D^TD - I\|_F^2$$

where $\circ$ represents a Hadamard product of element-by-element multiplication; $X = [x_1, \ldots, x_n] \in \mathbb{R}^{m^3 \times n}$ represents a set of signals in the training dataset; $M = [M_1^T M_1 1, \ldots, M_n^T M_n 1] \in \mathbb{R}^{m^3 \times n}$ represents a set of mask matrices for all the signals in the training dataset; and $1 \in \mathbb{R}^{m^3}$ represents a vector in which all elements are 1.

5. The graph dictionary learning method for the 3D point cloud according to claim 4, wherein the alternating direction method of multipliers comprises:
transforming the dictionary update optimization sub-problem into a constrained optimization problem by introducing an auxiliary variable Z instead of D for separating a second term and a third term which are non-convex from a first term which is convex:

$$\min_D \frac{1}{n}\sum_{i=1}^{n}\frac{1}{2}\|M \circ (X - DA)\|_F^2 + \beta\sum_{s=1}^{s}J(Z_s) + \gamma\|Z^TZ - I\|_F^2 \ \text{s.t.} \ D = Z$$

wherein $Z = [Z_1, \ldots, Z_S]$, $Z_s = D_s$, $s = 1, \ldots, S$ represent a sub-auxiliary variable corresponding to each dictionary;
transforming the constrained optimization problem into its augmented Lagrange function by introducing a dual variable $U \in \mathbb{R}^{m^3 \times Sm^3}$ so as to obtain three suboptimization problems:

$$D^+ = \arg\min_D \frac{1}{n}\sum_{i=1}^{n}\frac{1}{2}\|M \circ (X - DA)\|_F^2 + \frac{\rho}{2}\|D - Z + U\|_F^2$$

$$Z^+ = \arg\min_Z \beta\sum_{s=1}^{s}J(Z_s) + \gamma\|Z^TZ - I\|_F^2 + \frac{\rho}{2}\|D - Z + U\|_F^2$$

$$U^+ = U + D - Z$$

where $\rho$ represents an introduced penalty parameter; $D^+$, $Z^+$ and $U^+$ obtained by solving in each iteration step are taken as the input of a next iteration step;
solving three sub-optimization problems alternately to update three variables until convergence so as to obtain the graph dictionary.

6. A 3D point cloud signal encoding method based on graph dictionary learning, comprising: encoding a 3D point cloud signal to generate a 3D point cloud signal bitstream according to the graph dictionary obtained according to the method of claim 1;
wherein the encoding a 3D point cloud signal to generate a 3D point cloud signal bitstream comprises:
performing quality layer division on the 3D point cloud signal to obtain l quality layers;
encoding a point cloud signal of a single quality layer to obtain a point cloud signal bitstream of the quality layer;
decoding a point cloud signal of a single quality layer to obtain a reconstructed point cloud signal of the quality layer;
encoding and decoding l quality layers successively, and merging the point cloud signal bitstream of l quality layers to obtain the 3D point cloud signal bitstream.

7. The 3D point cloud signal encoding method based on graph dictionary learning according to claim 6, wherein the performing quality layer division on the 3D point cloud signal to obtain l quality layers comprises:
  dividing the 3D point cloud data into l quality layers, wherein according to the quality layers from low to high, a first layer is a base layer, l−1 layers after the first layer are enhancement layers, respectively including a first enhancement layer up to the $(l-1)^{th}$ enhancement layer; and respectively obtaining point cloud signals of the base layer and each of the enhancement layers.

8. The 3D point cloud signal encoding method based on graph dictionary learning according to claim 7, wherein the obtaining point cloud signals of the base layer and each enhancement layer comprises:
  voxelizing point cloud data, and outputting a voxelized point cloud signal as a point cloud signal of a highest quality layer;
  performing voxel block merging for l−1 times on the voxelized point cloud signal to obtain point cloud signals of l−1 different quality layers as point cloud signals of the base layer and the first to $(l-2)^{th}$ enhancement layers;
  wherein the input of each voxel block merging is the point cloud signals of the high quality layer obtained by previous voxel block merging; and the output of the point cloud signals of the low quality layer is taken as an input of a next voxel block merging.

9. The 3D point cloud signal encoding method based on graph dictionary learning according to claim 8, wherein the voxel block merging comprises:
  dividing a boundary cube where a point cloud signal of the high quality layer is located into uniform c×c×c voxel blocks, where c is a preset side length of a voxel block;
  merging voxels contained in each voxel block as one voxel of the point cloud signal of the lower quality layer;
  reducing a maximum value of the geometric coordinates of the voxels contained in each voxel block by c times and rounding same as the geometric coordinates of the corresponding voxels in the point cloud signal of the lower quality layer;
  taking average values of the attribute signals of the voxels contained in each voxel block as a value of the attribute signal of the corresponding voxel in the point cloud signal of the lower quality layer; and
  obtaining the point cloud signals of the lower quality layer.

10. The 3D point cloud signal encoding method based on graph dictionary learning according to claim 6, wherein the encoding a point cloud signal of a single quality layer to obtain a point cloud signal bitstream of the quality layer comprises:
  encoding geometry information, dividing the geometric coordinates of the point cloud signals according to an octree structure, allocating an eight-bit byte unit for each branch node in the octree structure to represent whether point data of a point cloud exists in a space unit corresponding to a sub-node of the branch node, traversing the octree structure in a depth-breadth first order to obtain a byte unit sequence representing the geometric coordinates of all the space units, and entropy encoding the byte unit sequence to obtain a geometry information bitstream;
  performing an inter-layer attribute prediction, and only for the enhancement layers, obtaining the predicted attribute signal in the current layer using the previous decoded layer and the geometric coordinates of the point cloud in the current layer for attribute signal pre-processing;
  pre-processing an attribute signal, and dividing a boundary cube where the point cloud signal of the current layer is located into m×m×m voxel blocks uniformly according to a pre-set side length m; if the input quality layer is a base layer, averaging the values of the attribute signals of the voxels contained in each voxel block to obtain a direct current attribute signal, and subtracting the direct current attribute signal from the attribute signals of the voxels contained in each voxel block to obtain a residual attribute signal; if an input quality layer is an enhancement layer, subtracting the inter-layer prediction signal from a current layer attribute signal to obtain a residual attribute signal of the current layer;
  encoding the direct current attribute signal, uniformly quantizing only the direct current attribute signal of the base layer, differencing the adjacent quantized direct current attribute signal of each voxel block, and entropy encoding the same to obtain a direct current attribute signal bitstream;
  encoding the residual attribute signal, performing geometry adaptive sparse coding on the residual attribute signal of each cube block by the graph dictionary and the geometric coordinates of the current layer to obtain a sparse coefficient matrix, performing uniform quantization on the sparse coefficient matrix, and performing entropy encoding on the values and positions of non-zero elements in the quantized sparse coefficient matrix respectively to obtain a residual attribute signal bitstream; and
  merging the point cloud signal bitstream, merging the geometry information bitstream and the attribute signal bitstream of an $l^{th}$ quality layer to obtain the point cloud signal bitstream of the $l^{th}$ quality layer.

11. The 3D point cloud signal encoding method based on graph dictionary learning according to claim 10, wherein the performing an inter-layer attribute prediction comprises:
  determining the input quality layer; if it is a base layer, performing no operation;
  if it is an enhancement layer, dividing a boundary cube where the point cloud signal of the current layer is located into uniformly distributed c×c×c voxel blocks by the geometric coordinates, and predicting the attribute signals of voxels contained in each voxel block;
  enlarging the geometric coordinates of each voxel of the previous quality layer point cloud signal by c times and rounding same, searching for voxels of the previous layer point cloud signal corresponding to 19 connected voxel blocks with a closest spatial distance to each voxel block, including the voxels themselves, calculating the spatial distance between the voxels contained in each voxel block and 19 voxels connected to the voxel block in the previous layer point cloud signal one by one, selecting 7 connected voxels with the closest spatial distance, and performing a weighted average on attribute signals of the 7 connected voxels with the reciprocal of the spatial distance of the 7 connected voxels as a weight to obtain the inter-layer prediction signal of voxels contained in the voxel block.

12. The 3D point cloud signal encoding method based on graph dictionary learning according to claim 10, wherein the encoding the residual attribute signal comprises:

extracting the corresponding rows from the graph dictionary to form a sub-dictionary by the geometric coordinates of voxels contained in each voxel block;

normalizing the extracted sub-dictionary corresponding to each voxel block;

performing geometry adaptive sparse coding on the residual attribute signal of voxels contained in each voxel block based on a $\ell_0$ sparse regularization term by the normalized sub-dictionary to obtain a sparse coefficient matrix; and performing uniform quantization on the sparse coefficient matrix, entropy encoding on the values and positions (row coordinates and column coordinates) of non-zero elements of the quantized sparse coefficient matrix, and merging same to obtain a residual attribute signal bitstream.

13. The 3D point cloud signal encoding method based on graph dictionary learning according to claim 6, wherein the decoding a point cloud signal of a single quality layer to obtain a reconstructed point cloud signal of the quality layer where the point cloud signal is located comprises:

splitting the point cloud signal bitstream, splitting the point cloud signal bitstream of the $l'^{th}$ quality layer, and obtaining a geometry information bitstream and an attribute signal bitstream of the $l'^{th}$ quality layer;

decoding geometry information to obtain an octree structure and a byte unit of each branch node from the geometry information bitstream entropy decoding, and then obtain geometric coordinates of each voxel;

performing inter-layer attribute prediction to obtain a predicted signal from a reconstructed point cloud signal of a previous quality layer;

decoding the direct current attribute signal, performing entropy decoding only on the direct current attribute signal bitstream of the base layer, adding same for each voxel block to a decoded direct current signal of an adjacent voxel block, and performing inverse uniform quantization to obtain a reconstructed direct current signal;

decoding the residual attribute signal, performing entropy decoding and inverse quantization on the residual attribute signal bitstream to obtain a reconstructed sparse coefficient matrix; by using the geometric coordinates of the voxels contained in each voxel block, extracting a corresponding rows from a graph dictionary to form a sub-dictionary, and performing normalization; multiplying the normalized sub-dictionary by a sparse vector of a corresponding voxel block in the reconstructed coefficient matrix to obtain a reconstructed residual attribute signal of voxels contained in the corresponding voxel block;

reconstructing the 3D point cloud and determining the input quality layer; if it is a base layer, adding the direct current attribute signal of the base layer and the residual attribute signal of the base layer to obtain a reconstructed attribute signal of the base layer; if it is an enhancement layer, adding the inter-layer prediction signal and the enhancement layer residual attribute signal to obtain a reconstructed attribute signal of the enhancement layer; and aligning the reconstructed attribute signal and the geometric coordinates to obtain a reconstructed point cloud signal of the current layer for single-quality layer point cloud signal encoding and point cloud signal decoding of the next enhancement layer.

14. A 3D point cloud signal decoding method based on graph dictionary learning, which is used for decoding the 3D point cloud signal bitstream obtained by the 3D point cloud signal encoding method based on graph dictionary learning according to claim 6, comprising:

intercepting point cloud signal bitstream of top l' quality layers from the 3D point cloud signal bitstream, l' being any positive integer not less than l, sequentially corresponding to a base layer, a first enhancement layer, . . . , and an $(l'-1)^{th}$ enhancement layer according to the number of layers; and according to the graph dictionary, performing single-quality layer point cloud signal decoding on the l' quality layers successively from the base layer to obtain reconstructed 3D point cloud signals corresponding to the top l' layers, l'≤l.

\* \* \* \* \*